US007062041B2

United States Patent
Buchner et al.

(10) Patent No.: US 7,062,041 B2
(45) Date of Patent: Jun. 13, 2006

(54) DEVICE AND METHOD FOR CARRYING OUT MULTICHANNEL ACOUSTIC ECHO CANCELLATION WITH A VARIABLE NUMBER OF CHANNELS

(75) Inventors: Herbert Buchner, Nittendorf (DE); Walter Kellerman, Eckental (DE)

(73) Assignee: Grundig Multimedia B.V., Balerna (CH)

( * ) Notice: Subject to any disclaimer, the term of this patent is extended or adjusted under 35 U.S.C. 154(b) by 17 days.

(21) Appl. No.: 10/493,910

(22) PCT Filed: Oct. 25, 2002

(86) PCT No.: PCT/EP02/11934

§ 371 (c)(1),
(2), (4) Date: Sep. 21, 2004

(87) PCT Pub. No.: WO03/039115

PCT Pub. Date: May 8, 2003

(65) Prior Publication Data

US 2005/0047609 A1 Mar. 3, 2005

(30) Foreign Application Priority Data

Oct. 27, 2001 (DE) ................................ 101 53 188

(51) Int. Cl.
*H04M 1/00* (2006.01)
(52) U.S. Cl. ........................... 379/406.14; 379/406.08; 379/406.04
(58) Field of Classification Search ........... 379/406.01, 379/406.04, 406.08, 406.14
See application file for complete search history.

(56) References Cited

FOREIGN PATENT DOCUMENTS

JP          09-130306      *   5/1997

* cited by examiner

*Primary Examiner*—Jefferey F. Harold
(74) *Attorney, Agent, or Firm*—Quarles & Brady LLP

(57) ABSTRACT

A multichannel full-duplex audio signal transmission system, comprising an adaptive filter (2) provided for multichannel acoustic echo cancellation. A channel combining device (5) is provided between the preprocessing units (V1, . . . VD) and loudspeakers (L1, . . . ,LD), in which several (C>D) loudspeakers can be connected to one and the same preprocessing unit and by means of which the remaining D-C preprocessing units can be separated from the loudspeakers (L1, . . . , LD). The channel combining device permits an optimization of the convergence ratio of the adaptive adjustment of filter coefficients in said adaptive filter (2).

6 Claims, 1 Drawing Sheet

State of the Art

DEVICE AND METHOD FOR CARRYING OUT MULTICHANNEL ACOUSTIC ECHO CANCELLATION WITH A VARIABLE NUMBER OF CHANNELS

BACKGROUND OF THE INVENTION

The present invention concerns a device and a method for multichannel acoustic echo compensation with variable number of channels as they are used especially for acoustic human-machine interfaces with hands-free devices and multichannel output, in order to make multichannel full-duplex communication possible.

The basic problems of acoustic echo compensation are described in detail in the review article "Stereophonic Acoustic Echo Cancellation—An Overview of the Fundamental Problem", IEEE Signal Processing Letters, Vol. 2, No. 8, August 1995, by M. Mohan Sondhi et al.

If only a single full-duplex audio channel is used for bi-directional speech transfer between a first as well as a second audio transmission and receiving unit in acoustic human-machine interfaces, for example, microphones, loudspeakers in video conference systems or telephone conference systems, then, an acoustic echo compensation can be performed by using adaptive filters in order to suppress undesirable echoes which arise from feedback between loudspeakers and microphones in the first and second audio transmission and receiving units.

In conventional single-channel acoustic echo compensators, the use of a single FIR (finite impulse response) filter with adaptive adjustable filter coefficients is sufficient to model the acoustic pulse response of the echo path. An estimated signal for the echo modeled by the adapted filter is then deducted from the actual echo signal to obtain an error signal, which is adjusted to the echo path which may possibly change in the course of time, by permanent adaptive continued regulation of the filter coefficients, so that the error signal is continuously kept as low as possible.

However, especially in video conference or telephone conference transmissions, it may be desirable, using of several acoustic transmission channels, each with at least one assigned loudspeaker, to transfer an acoustic pattern which is as true to the room as possible, from a first to a second audio transmission and receiving unit. For example, this is of interest, when several speakers are located in a first room, from whom the speech sound is to be transferred to a receiver in a second room. If one then uses two or more acoustic transmission channels to a second room, where a listener is located, then this listener receives a stereo or multichannel acoustic pattern from the first room, which makes it easier for him, for example, to assign the speech sound to the individual speakers.

As explained by the above review article, for example, also in "Stereo Projection Echo Canceller with True Echo Path Estimation", Proc. IEEE International Conference on Acoustics, Speech and Signal Processing (ICASSP 95), Detroit, Mich., USA, PP. 3059–3062, May 1995, by S. Shimauchi et al. or "A better understanding and an improved solution to the problems of stereophonic acoustic echo cancellation", Proc. IEEE International Conference on Acoustics, Speech, and Signal Processing (ICASSP 97), Munich, pp. 303–306, April 1997, by J. Benesty et al., however, due to the mutual influence of the individual transmission channels among one another, in the case of stereo or multichannel compensation, a number of additional problems occur in comparison to the mono-channel situation, where an individual adaptive filter is sufficient for echo compensation.

Various solution sets for problems that occur in the multichannel case are especially explained in the article "Stereophonic Acoustic Echo Cancellation—An Overview and Recent Solutions"; Proc. 6$^{th}$ Int. Workshop on Acoustic Echo and Noise Control, Pocono Manor, Pa., USA pp. 12–19, September 1999, by S. Makino et al. Individually, the following are dealt with: addition of statistically independent noise signals to the loudspeaker signals, nonlinear signal processing; the use of decorrelation filters, the use of various time-variable filter techniques, and the use of special adaptive algorithms in the filters.

Especially in the multichannel case, according to our state of knowledge today, signal processing for partial (not detectable) decorrelation of the loudspeaker signals is necessary in order to make unequivocal convergence of adaptive filters to the true room pulse responses possible. As already stated, the basic idea of echo compensation is to simulate, using digital filter structures, the echo paths which arise from the interplay of certain loudspeaker characteristics, a certain room acoustics and a certain microphone characteristics.

This will be explained below in more detail with the aid of FIG. 3. In the case of the echo compensation device according to the state of the art shown there, the audio signals emitted by a multichannel audio signal processing unit 1, are sent through separate loudspeaker channels LK1, . . . , LKD to the corresponding loudspeakers L1, . . . , LD. A channel-specific pre-processing unit V1, . . . , VD is located in each section of the loudspeaker channels LK1, . . . , LKD. The audio signals running through the pre-processing units V1, . . . , VD can each be locked there individually in a channel-specific manner.

The loudspeakers L1, . . . , LD assigned individually to loudspeaker channels LK1, . . . , LKD emit acoustic signals corresponding to the received audio signals into the surrounding room.

Furthermore, a microphone M is provided which serves as input interface for acoustic signals, for example, speech sounds from a person speaking into the microphone.

The microphone M converts the received acoustic signals into microphone signals, which are sent back to the multichannel audio signal processing unit 1 through a microphone channel MK for further processing.

The acoustic signals radiated by loudspeakers L1, . . . , LD are superimposed depending on the structures in the room, in which the loudspeakers L1, . . . , LD are set up, and are also received by microphone M.

As a result of this, echo signals are produced, because the acoustic signals emitted by the loudspeakers L1, . . . , LD are received by the microphone M, from there are sent to the multichannel audio signal processing unit 1, from where, under certain circumstances, are sent again to loudspeakers L1, . . . , LD.

The basic idea of echo compensation is to compensate by digital filter structures the "echo paths" arising from the interaction of the acoustic signals emitted by the loudspeakers L1, . . . , LD and from their difference paths predetermined by the spatial propagation conditions to microphone M and by the microphone characteristics. This occurs by the fact that such digital filter structures produce estimate signals for the echo signals expected through the echo paths and that the estimate signals are subtracted from the microphone signals which contain the actual echo signals.

If there was exact agreement between the real room pulse responses and the pulse responses of the digital filter, the echo signals would be extinguished in the microphone signal.

However, since the echo paths generally have a very complex structure which is not known beforehand and which, in addition, can change in time, the echo paths must be continuously reidentified, that is, adaptively identified.

The adaptive filter 2 shown in FIG. 3 serves this purpose: the audio signals entered through channels LK1, ..., LKD to loudspeakers L1, ..., LD are introduced to this filter through branch lines A1, ..., AD. In the adaptive filter 2 the audio signals introduced through branch lines A1, ..., AD are superimposed on weighting coefficients (filter coefficients) to be optimized, according to specified adaptation algorithms. The adaptive adjustment is based on mathematical models which provide adjustment of the temporarily valid filter coefficients to the temporarily valid echo path conditions.

In order to make unequivocal convergence of the filter coefficients to the true room pulse responses possible in the multichannel case, the signal pre-processing, which is necessary according to our present-day knowledge (see, for example, the article by J. Benesty et al. mentioned above) for partial (acoustically not detectable) decorrelation of the loudspeaker signals, is carried out in the preprocessing units V1, ..., VD shown in FIG. 1.

However, it can be shown theoretically and experimentally that, in spite of this preprocessing, the expenditure for echo compensation generally increases with increasing number of channels and the convergence behavior of the individual channel signals to be superimposed in the adaptive filter becomes worse. If D different preprocessing units are used then this leads to very slow convergence of the filter coefficients when the actual number of channels C of the audio signal is smaller than the actual number of channels D, that is, when C<D. This case is typical for the use in multimedia terminal equipment (for example, when a multimedia terminal equipment is used as stereo television unit, with which a broadcast is considered in which the tone is displayed only with one mono-channel.

The performance of multichannel echo compensation for acoustic interfaces in multimedia terminals is a relatively new application. Conventional attachments for telephone conference applications provide a fixed channel number, D, for the audio signals.

The relatively slow convergence behavior arises in this case by insufficient decorrelation of originally exactly the same audio signals which are passed through separate audio channels.

The solution set known from the article by J. Benesty et al. cited above as state of the art provides D equal nonlinear preprocessing units, as a result of which the above problem is lessened. In any case, in this way the decorrelation possibilities are also limited, especially when the signals of the individual channels differ mainly in their levels (for example, in case of intensity stereophony).

SUMMARY OF THE INVENTION

Therefore, the task of the present invention is to overcome the disadvantages of the devices known from the art for multichannel acoustic echo compensation with a variable number of channels.

Especially, it is the task of the present invention to provide a device for multichannel acoustic echo compensation with a variable number of channels for the case in which the actually-used number of channels, C, is smaller than the number of actually present channels, D, and where the problems arising in connection with decorrelation in connection with the state of the art are avoided.

Furthermore, it is a task of the present invention to provide methods for multichannel echo compensation where the number of channels used, C, is smaller than the number of channels actually present, D.

The approach according to the invention for echo compensation in the reproduction of C-channeled audio signals on a D-channel system (C<D) makes use of the fact that the number of channels of the audio signal is known (for example, when stereo information is present in a television signal). Therefore, it is possible to decorrelate only the C<D actually-used audio channels through independently operating preprocessing units. The remaining D-C loudspeaker signals are then combined only with the actually-used C audio channels (for example, in the mono case both loudspeaker signals are connected to channel 1 of a stereo system).

BRIEF DESCRIPTION OF THE DRAWINGS

The advantages and characteristics of the present invention follow from the explanation of preferred practical examples given below in combination with the drawings.

The following are shown.

DETAILED DESCRIPTION

A first embodiment of a device according to the invention for echo compensation will be explained below as an example based on FIG. 1.

Figure 3:
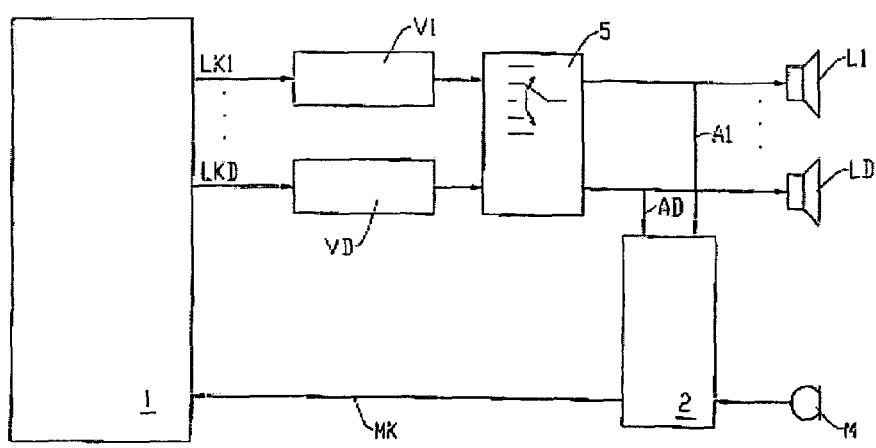
FIG. 3 shows a schematic representation of a known device for multichannel echo compensation according to the state of the art.

Here, elements which were already explained in combination with the state of the art according to FIG. 3 are provided with identical reference numbers to those in FIG. 3 and will not be explained in more detail below.

Figure 1:
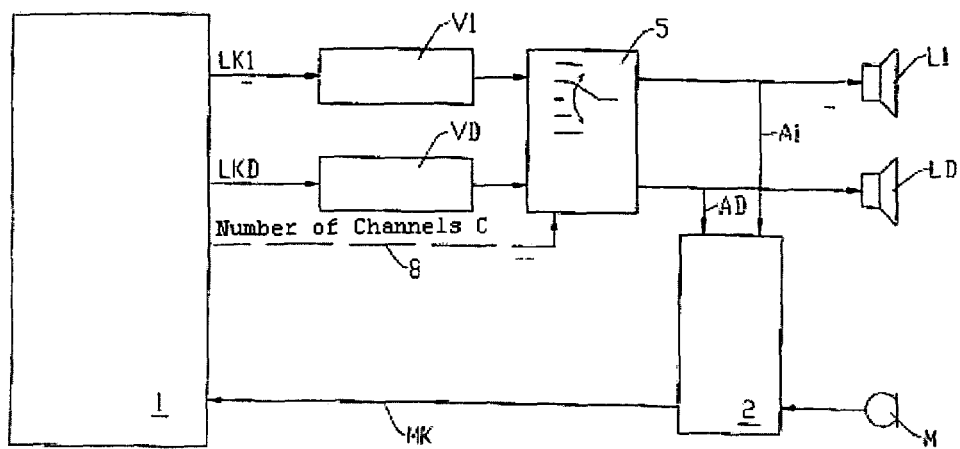
FIG. 1 shows a schematic representation of a first embodiment of a device according to the invention for multichannel echo compensation.

In addition to the elements shown in FIG. 3, FIG. 1 shows the first embodiment of a device according to the invention and a channel combination device 5 which is provided between the D preprocessing units V1, ..., VD and the branch lines A1, ..., AD leading to the adaptive filter 2.

Furthermore, a data line 8 is provided between the multichannel audio signal processing unit 1 and the channel-combination device 5. The multichannel audio signal processing unit 1 transmits through data line 8 the C channels actually to be used to channel-combination device 5, and this number of channels can be smaller than the number D of the total channels actually present.

Using channel-combination device 5, always several loudspeakers, which are supposed to receive exactly the same audio signals, are connected to a single common inlet line, and namely according to the number C of channels actually to be used, which is provided by the multichannel audio signal processing unit 1 to the channel-combination device 5. The channel-combination device 5 decouples then the unnecessary D-C preprocessing units from the loudspeakers. In the most general case, this is done by simply connecting several loudspeakers with an inlet line in the channel-combination device 5. Thus, the unnecessary D-C preprocessing units are decoupled from the loudspeakers.

In other words:

Through D loudspeaker channels LK1, ..., LKD, the loudspeaker channel signals LS1, ..., LSD entered by the multichannel audio signal processing installations 1 are combined with one another in the channel-combination device 5 by superimposing individual loudspeaker signals to one another loudspeaker signals so that at the exit of the channel-combination device, only C<D independent output signals are present.

This will be explained in the following example: in case of a reduction from seven input loudspeaker channel signals LS1, LS2, LS3, LS4, LS5, LS6, LS7 to four signals LS1, LS23, LS4, LS567, the entering loudspeaker channel signals LS1 and LS4 are left unchanged, but the loudspeaker channel signals LS2 and LS3 are combined to a signal LS23 and the loudspeaker channel signals LS5, LS6 and LS7 are combined to a signal LS567. These four output signals LS1, LS23, LS4 and LS567 can then be introduced, for example, to the seven loudspeakers that were provided in this case as follows:

LS1 to L1, LS23 to L2 and to L3, LS4 to L4, LS567 to L5, L6 and L7.

With the measures according to the invention, the additional convergence problems of the filter coefficients are avoided, which do occur in the conventional multichannel echo compensation with loudspeaker signals at reduced number of channels.

When using a device according to the invention for multichannel echo compensation, in which, using a channel-combination device, only C<D audio channels are actually utilized, the performance that can be achieved with a D-channel echo compensator (D>C) is comparable to that achievable with a conventional only C-channel echo compensator. All this is possible with an extremely small additional expenditure, namely by providing the said channel-combination device 5.

The approach according to the invention is independent of the actual adjustment algorithm used, of the actual preprocessing method used, and of channel number D of the system.

For echo compensation in the case of C channels, in a device according to the invention, a maximum of C of the actually-present D preprocessing units are used.

In order to achieve maximum efficiency, exactly C different preprocessing units must be used.

Figure 2:
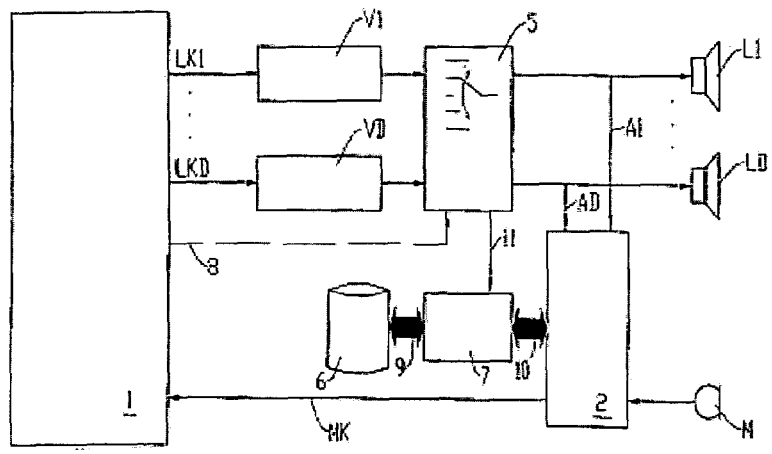
FIG. 2 shows a schematic representation of a second embodiment of a device according to the invention for multichannel echo compensation.

A second embodiment of the device according to the invention for echo compensation is explained now in more detail with the aid of FIG. 2. In this embodiment, the elements shown in FIG. 1 are complemented by an intermediate buffer 6 as well as by a transfer logic 7. The intermediate buffer 6 is in connection with a transfer logic 7 through a bi-directional bus line 9, and the transfer logic is again in connection with the adaptive filter 2 through a bi-directional bus line 10. In addition, the transfer logic 7 is connected to the channel-combination device 5 through a unidirectional bus line 11.

Intermediate buffer 6 serves for storage of estimated pulse responses which had been determined previously by the adaptive filter 2 and which were transported through the bi-directional bus line 10 into the transfer logic 7 and from there, through bi-directional bus line 9 into intermediate buffer 6.

In a system with D loudspeaker channels and an adaptive filter 2, in which a number L of filter coefficients is provided for each loudspeaker channel, sufficient memory must be present in the intermediate buffer 6 in order to be able to store L filter coefficients for the maximum number of the D channels used. That is, the possibility must exist to store D L estimated filter coefficients.

The transfer logic 7 receives from the channel-combination device 5 through bus line 11 the indices of the presently-used channels, the number of which is smaller than or equal to the number D of the actually-available channels.

The meaning of such buffer storage of estimated pulse responses (filter coefficients) is the following: if one changes from a number of channels X originally used during an operational phase a to a different number and from a number of channels Y during an operational phase b, and again during a following operational phase c change back to the number of channels X, then, at the beginning of operational phase c, the filter coefficients already used until the end of operational phase a can be recaptured as starting values for renewed adjustments necessary due to any changes in room acoustics that could have occurred in the meantime.

In order to make this procedure more understandable, let us discuss, for example, the following scenario: in a multi-media television system with 5-channel Dolby surround-sound installation, certain television broadcasts (for example, feature films) are received with a 5-channel tone. Other television broadcasts (for example, commercials or newscasts) are received, however, for example, with only 2-channel tones, or even with 1-channel tone (mono). The reduced number of tone channels were then equally reproduced through the 5-channel Dolby surround-sound installation. This occurs, as explained above, by the combination of individual loudspeaker channel signals to combination signals.

If now a viewer first views, for example, a television broadcast with 5-channel tones, then when using a device according to the invention and a method according to the invention, multichannel echo compensation is utilized for a given set of acoustic conditions in the room for the determination of certain filter coefficients in the adaptive filter 2 shown in FIG. 2. Now, if the viewer now, for example, switches from the just-viewed television broadcast with 5-channel tones to another television broadcast with 2-channel tones (stereo tone), then an adaptive adjustment must be carried out again for the 5 signals emitted by the channel combination device 5, that is, 2 new filter coefficients for the 2-channel case must be calculated in the adaptive filter 2. If the viewer then switches back again to the originally-watched television broadcast with 5-channel tones, then adjustment of the adaptive filters for the 5-channel case is necessary again. If the room acoustic conditions in the meantime were unaltered, then the adaptive filter 2 now will find the same filter coefficients for the 5-channel case which were present before switching from the 5-channel tone broadcast to the 2-channel tone broadcast. In order to save the time period that the adaptive filter needs to converge again to the filter coefficients suitable for the 5-channel case, with the aid of the measures according to claim 6, one can simply use again the filter coefficients that were suitable before switching from the 5-channel transmission to the 2-channel transmission at constant room acoustic conditions as before, which were stored in buffer 6 for intermediate storage.

Even when during the time span until the renewed switching back to the 5-channel transmission, a change would have occurred in the acoustic conditions in the room (for example, because people left the room or came in), in practice it should be assumed that these changes are so slight that the filter coefficients which were stored in buffer 6 would still be relatively suitable for the new acoustic conditions in the room, and thus would be very good starting values for a renewed adjustment process of the adaptive filters 2, so that, based on the predetermined start values, the time duration needed for reaching a convergent state of the filter coefficients is usually significantly shorter than when the adaptive filter with arbitrary start values would have to perform complete new calculation of the adaptive filter coefficients for the 5-channel tone case with changed room acoustic conditions.

This method of buffer storage of previously-determined filter coefficients naturally makes sense even when first the switch is from a smaller number of audio channels used (for example, 2) to a larger number of audio channels used (for example, 5) and then again switching back to the original smaller number.

For the compensation unit even at C<D independent audio channels, a D-channel adaptive filter is used since the computing capacity would have to be dimensioned for D channels anyway in order to be able to cover even the case when all D channels are to be used.

If the other D-C loudspeaker signals are combined with the C actually-used audio channels, then all physically correct echo paths could no longer be identified separately; however, this is not necessary in this case since the correlation between loudspeakers that are connected directly to one another cannot be altered.

REFERENCE LIST

1 Multichannel audio signal processing unit
2 Adaptive filter
5 Channel-combination device
6 Buffer
7 Transfer logic
8 Data line
9, 10 Bi-directional bus line
11 Unidirectional bus line
A1, ..., AD Branch lines
L1, ..., LD Loudspeakers
LK1, ..., LKD Loudspeaker channels
LS1, ..., LSD Loudspeaker channel signals
M Microphone
MK Microphone channel
V1, ..., VD Preprocessing units
a, b, c Operational phases
X, Y Number of channels used

The invention claimed is:

1. Device for multichannel acoustic echo compensation for acoustic interfaces, which includes the following:
    a multichannel audio signal processing unit (1);
    a number, D, audio signal channels (LK1, ..., LKD) going out from the multichannel audio signal processing unit (1);
    wherein each audio signal channel has a respective audio signal preprocessing unit (V1, ..., VD) assigned to the respective audio channel;
    wherein at least one loudspeaker (L1, ..., LD) is assigned to each respective audio signal channel;
    wherein one branch line (A1, ..., AD) is branched off to a D-channel adaptive filter (2) from each audio signal channel between the particular assigned preprocessing unit (Vi, ..., VD) and the particular assigned at least one loudspeaker (L1, ..., LD);
    a microphone (M) connected to the adaptive filter (2);
    a microphone channel (MK) leading back from the adaptive filter to the multichannel audio signal processing unit (1);
    a channel combination device;
    wherein a preprocessing unit (V1, ..., VD) is assigned to each audio channel; and
    wherein the channel-combination device (5) is arranged between the preprocessing units (V1, ..., VD) and the loudspeakers such that in the channel-combination device (5), a number, C, of loudspeaker channels can be combined with fewer than the number, D, of audio signal channels.

2. Device according to claim 1, further comprising:
    a transfer section (8) between the multichannel audio signal processing unit (1) and the channel-combination device (5), through which the C number of channels actually to be occupied by the multichannel audio signal processing unit (1) can be transmitted to the channel-combination device (5).

3. Device according to claim 1, further comprising:
    a transfer logic (7) which communicates with the channel-combination device (5) and the adaptive filter (2), and
    an intermediate buffer (4) which communicates with the transfer logic (7).

4. Device for multichannel acoustic echo compensation according to claim 3, wherein
    the intermediate buffer has a buffer capacity for D×L filter coefficients transmitted by the transfer logic, where D is a plural number of channels of the system and L is a number of filter coefficients for a particular channel.

5. Method for multichannel acoustic echo compensation for acoustic interfaces wherein
    a number D of loudspeaker channel signals are always subjected to signal preprocessing before they are transmitted to the loudspeakers (L1, ..., LD);
    the loudspeaker channel signals are additionally branched to a device (2) for adaptive filtering of loudspeaker signals, wherein the branched loudspeaker signals are subjected to adaptive adjustment to produce an echo compensation signal, which is deducted from a microphone signal for the purposes of minimization of the echo and the microphone signal echo-minimized in this way is transmitted to a multichannel audio signal processing unit (1) for further processing and renewed output as loudspeaker channel signals;
    after signal preprocessing, individual ones of the D loudspeaker signals are so combined that only C<D combination signals remain which are transmitted through the assigned C loudspeaker channels to D loudspeakers, and that only these C combination signals are subjected to adaptive adjustment.

6. Method according to claim 5, which further comprises, as additional steps, that before a change of a number of X actually-used channels to Y≠X actually-used channels, filter coefficients which are already identified for the X channels for adaptive adjustment to produce an echo compensation signal of an adaptive filter (2), are subjected to intermediate storage, and that after changing back the number of channels from Y channels to the number of X channels, the intermediate-buffered filter coefficients are used as start values for the necessary recalculation of filter coefficients for a renewed adaptive adjustment, in order to accelerate the convergence for further adjustment.

* * * * *